(12) United States Patent
Li et al.

(10) Patent No.: US 11,037,075 B2
(45) Date of Patent: Jun. 15, 2021

(54) METHOD AND SYSTEM FOR PROCESSING TRANSPORTATION REQUESTS

(71) Applicant: BEIJING DIDI INFINITY TECHNOLOGY AND DEVELOPMENT CO., LTD., Beijing (CN)

(72) Inventors: Xiang Li, Beijing (CN); Zhiqiang Zhou, Beijing (CN); Zhan Wang, Beijing (CN); Kehua Sheng, Beijing (CN); Niping Zhang, Beijing (CN)

(73) Assignee: BEIJING DIDI INFINITY TECHNOLOGY AND DEVELOPMENT CO., LTD., Beijing (CN)

(*) Notice: Subject to any disclaimer, the term of this patent is extended or adjusted under 35 U.S.C. 154(b) by 440 days.

(21) Appl. No.: 15/862,393

(22) Filed: Jan. 4, 2018

(65) Prior Publication Data
US 2019/0057483 A1    Feb. 21, 2019

(30) Foreign Application Priority Data
Aug. 16, 2017   (CN) .......................... 201710702067.3

(51) Int. Cl.
*G06Q 10/02* (2012.01)
*G01C 21/34* (2006.01)
(Continued)

(52) U.S. Cl.
CPC ......... *G06Q 10/02* (2013.01); *G01C 21/3438* (2013.01); *G06Q 50/30* (2013.01); *H04W 4/02* (2013.01); *H04W 88/02* (2013.01)

(58) Field of Classification Search
CPC ..... G06Q 10/02; G06Q 50/30; G01C 21/3438
(Continued)

(56) References Cited

U.S. PATENT DOCUMENTS

2003/0041131 A1   2/2003   Westerinen et al.
2004/0246905 A1   12/2004  Dunagan et al.
(Continued)

FOREIGN PATENT DOCUMENTS

CN   104823436 A   8/2015
CN   104867065 A   8/2015
(Continued)

OTHER PUBLICATIONS

Koenigsberg, Ernest, "On Jockeying in Queues", Management Science, Jan. 1966, vol. 12, No. 5, Series A, Sciences (Jan. 1966), pp. 412-436 (Year: 1966).*
(Continued)

*Primary Examiner* — Emmett K. Walsh
(74) *Attorney, Agent, or Firm* — Finnegan, Henderson, Farabow, Garrett & Dunner, L.L.P.

(57) ABSTRACT

Embodiments of the disclosure provide methods and systems for processing transportation requests. The method can include receiving, from a terminal device, a transportation request in a district. The method can also include determining a first queue associated with a queuing zone for placing the transportation request, the transportation request having a first estimated waiting time before being processed in the first queue. The method can further include determining a second queue associated with the queuing zone, the transportation request having a second estimated waiting time before being processed in the second queue, wherein the second estimated waiting time is shorter than the first estimated waiting time. The method can also include providing to the terminal device information related to the second queue.

17 Claims, 6 Drawing Sheets

(51) Int. Cl.
*G06Q 50/30* (2012.01)
*H04W 4/02* (2018.01)
*H04W 88/02* (2009.01)

(58) Field of Classification Search
USPC .............................................................. 705/5
See application file for complete search history.

(56) References Cited

U.S. PATENT DOCUMENTS

| | | | |
|---|---|---|---|
| 2009/0281817 A1* | 11/2009 | Ferrara | G06Q 10/06 705/1.1 |
| 2013/0054139 A1 | 2/2013 | Bodin et al. | |
| 2013/0132246 A1 | 5/2013 | Amin et al. | |
| 2015/0161752 A1* | 6/2015 | Barreto | G06Q 50/30 705/7.15 |
| 2015/0249692 A1* | 9/2015 | Sankaranarayanan | G06Q 10/063114 705/7.15 |
| 2016/0006577 A1 | 1/2016 | Logan | |
| 2016/0203576 A1* | 7/2016 | Novak | G01C 21/3438 705/26.7 |
| 2018/0096441 A1 | 4/2018 | Isert et al. | |

FOREIGN PATENT DOCUMENTS

| | | |
|---|---|---|
| CN | 105321129 A | 2/2016 |
| TW | 200503483 A | 1/2005 |
| TW | I240184 B | 9/2005 |
| WO | WO 2014/074407 A1 | 5/2014 |
| WO | WO 2016/112318 A1 | 7/2016 |
| WO | WO 2016/183810 A1 | 11/2016 |

OTHER PUBLICATIONS

A.M.K. Tarabia, "Analysis of two queues in parallel with jokeying and restricted capacities", Applied Mathematical Modelling 32 (2008) 802-810 (Year: 2008).*

International Search Report for the counterpart International application No. PCT/CN2018/076337, dated Apr. 27, 2018.

Written Opinion of the International Search Authority for the counterpart International application No. PCT/CN2018/076337, dated Apr. 27, 2018.

First Office Action for the counterpart Chinese Patent Application No. 201880000886.6, dated Jun. 1, 2020.

Extended European Search Report in counterpart to European Patent Application No. 18845484.7-1213/3669323, dated Jun. 17, 2020.

* cited by examiner

METHOD AND SYSTEM FOR PROCESSING TRANSPORTATION REQUESTS

CROSS REFERENCE TO RELATED APPLICATION

The present application is based on and claims the benefits of priority to Chinese Application No. 201710702067.3, filed Aug. 16, 2017, the entire contents of which are incorporated herein by reference.

TECHNICAL FIELD

The present disclosure relates to processing transportation requests, and more particularly to, methods and systems for queuing a transportation request by detecting a queue suitable for each transportation request.

BACKGROUND

An online hailing platform (e.g., DiDi™ online) can receive a transportation request from a passenger and then dispatch at least one transportation service provider (e.g., a taxi driver, a private car owner, or the like) to fulfill the service request. During certain time periods of a day, the online hailing platform can receive more transportation requests in a certain district than the capacity of the available service vehicles in the district. Accordingly, the transportation requests are typically lined up in a queue before being processed. However, it may take a long time before the transportation request can be processed in the queue based on the original request features of the transportation request. In the meantime, there may be other queues available to accommodate more requests and process them quickly. It is therefore inefficient to keep the transportation request in a queue solely based on its original request features.

Methods and systems for processing transportation requests are designed to identify a queue having a shorter waiting time for the transportation request and improve the efficiency of the online hailing platform.

SUMMARY

An embodiment of the disclosure can provide a computer-implemented method for processing transportation requests. The method can include receiving, from a terminal device, a transportation request in a district. The method can also include determining a first queue associated with a queuing zone for placing the transportation request, the transportation request having a first estimated waiting time before being processed in the first queue. The method can further include determining a second queue associated with the queuing zone, the transportation request having a second estimated waiting time before being processed in the second queue, wherein the second estimated waiting time is shorter than the first estimated waiting time. The method can also include providing to the terminal device information related to the second queue.

Another embodiment of the disclosure can further provide a system for processing transportation requests. The system can include a communication interface configured to receive, from a terminal device, a transportation request in a district. The system can further include a memory and at least one processor coupled to the communication interface and the memory. The at least one processor can be configured to determine a first queue associated with a queuing zone for placing the transportation request, the transportation request having a first estimated waiting time before being processed in the first queue. The at least one processor can be further configured to determine a second queue associated with the queuing zone, the transportation request having a second estimated waiting time before being processed in the second queue, wherein the second estimated waiting time is shorter than the first estimated waiting time. The at least one processor can also be configured to provide to the terminal device information related to the second queue.

Yet another embodiment of the disclosure can provide a non-transitory computer-readable medium that stores a set of instructions. When the set of instructions is executed by at least one processor of an electronic device, the electronic device can be caused to perform a method for processing transportation requests. The method can include receiving, from a terminal device, a transportation request in a district. The method can also include determining a first queue associated with a queuing zone for placing the transportation request, the transportation request having a first estimated waiting time before being processed in the first queue. The method can further include determining a second queue associated with the queuing zone, the transportation request having a second estimated waiting time before being processed in the second queue, wherein the second estimated waiting time is shorter than the first estimated waiting time. The method can also include providing to the terminal device information related to the second queue.

It is to be understood that both the foregoing general description and the following detailed description are exemplary and explanatory only and are not restrictive of the invention, as claimed.

DETAILED DESCRIPTION

Reference will now be made in detail to the exemplary embodiments, examples of which are illustrated in the accompanying drawings. Wherever possible, the same reference numbers will be used throughout the drawings to refer to the same or like parts.

An aspect of the disclosure is directed to a system for processing transportation requests.

Figure 1:
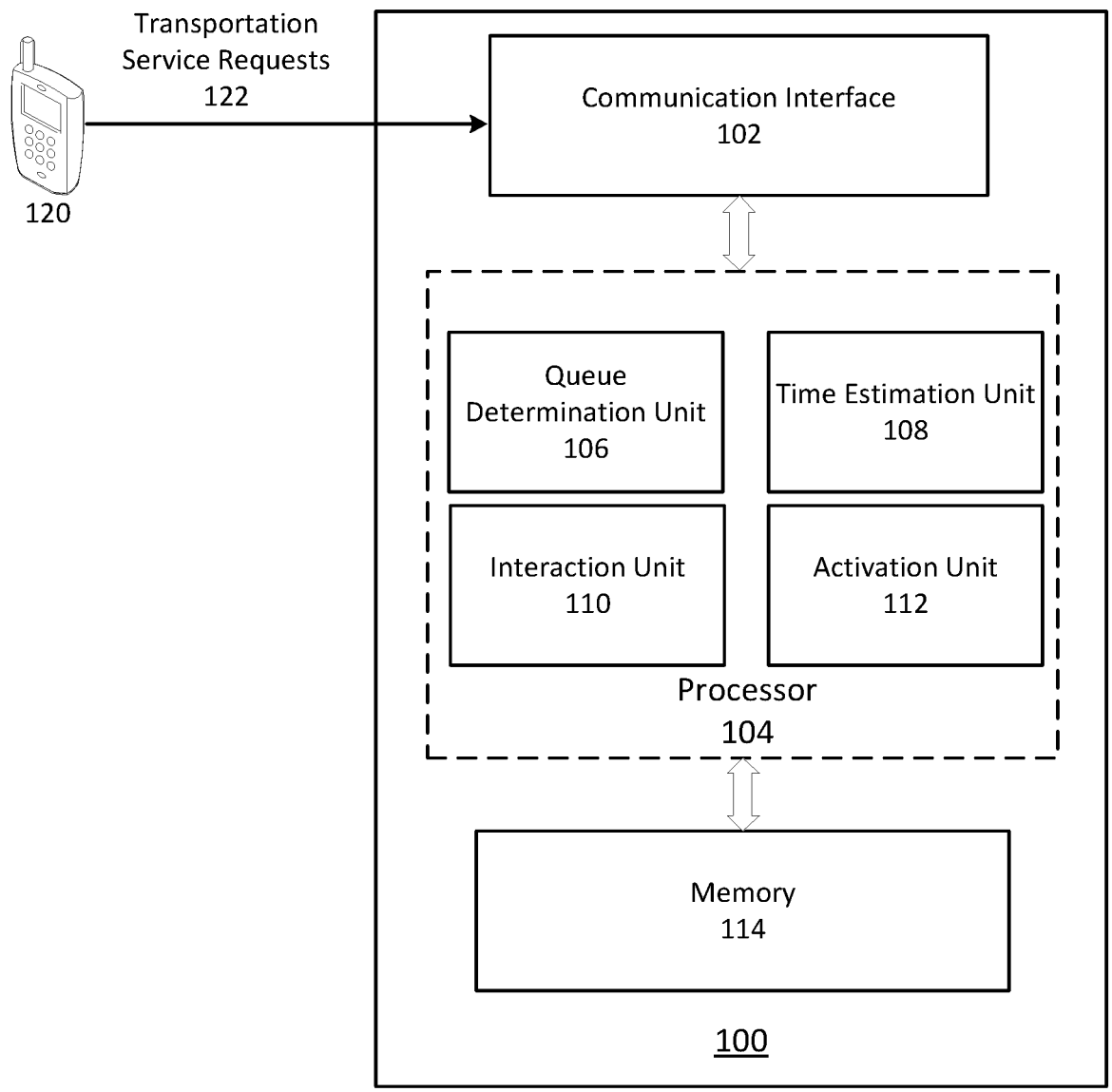
FIG. 1 illustrates a schematic diagram of an exemplary system for processing transportation requests, according to embodiments of the disclosure.

FIG. 1 illustrates a schematic diagram of a system 100 for processing transportation requests, according to embodiments of the disclosure.

System 100 can be a general-purpose server or a proprietary device specially designed for processing transportation requests. It is contemplated that, system 100 can be a separate system (e.g., a server) or an integrated component of a server. Because processing transportation requests may require significant computation resources, in some embodiments, system 100 may be preferably implemented as a separate system. In some embodiments, system 100 may include sub-systems, some of which may be remote.

In some embodiments, as shown in FIG. 1, system 100 may include a communication interface 102, a processor 104, and a memory 114. Processor 104 may further include multiple modules, such as a queue determination unit 106, a time estimation unit 108, an interaction unit 110, an activation unit 112, and the like. These modules (and any corresponding sub-modules or sub-units) can be hardware units (e.g., portions of an integrated circuit) of processor 104 designed for use with other components or to execute a part of a program. The program may be stored on a computer-readable medium, and when executed by processor 104, it may perform one or more methods. Although FIG. 1 shows units 106-112 all within one processor 104, it is contemplated that these units may be distributed among multiple processors located near or remotely with each other. In some embodiments, system 100 may be implemented in the cloud, or on a separate computer/server.

Communication interface 102 may be configured to receive, from a terminal device 120, a transportation request 122 in a district. Terminal device 120 can be any suitable device that can interact with a user, e.g., a smart phone, a tablet, a wearable device, a computer, or the like. Terminal device 120 may be a mobile device that can be carried by the user. Transportation request 122 can include request features, such as a current location of the passenger, an origin and a destination of the requested transportation, a departure time, a service type, a service vehicle type, or the like. In some embodiments, the current location of the passenger can be used as the location of transportation request 122.

In some embodiments, communication interface 102 can be an integrated services digital network (ISDN) card, cable modem, satellite modem, or a modem to provide a data communication connection. As another example, communication interface 102 can be a local area network (LAN) card to provide a data communication connection to a compatible LAN. Wireless links can also be implemented by communication interface 102. In such an implementation, communication interface 102 can send and receive electrical, electromagnetic or optical signals that carry digital data streams representing various types of information via a network. The network can typically include a cellular communication network, a Wireless Local Area Network (WLAN), a Wide Area Network (WAN), or the like.

In some embodiments, system 100 can determine a district can be predetermined based on the origin of the requested transportation service. For example, the district can be a hexagonal area that is neighbored with other hexagonal areas. It is contemplated that, the district can have shapes other than a hexagon, such as a circle, a square, a rectangle, etc. In some embodiments, the district can have a shape and size dynamically determined based on the current location of terminal device 120.

Figure 2:
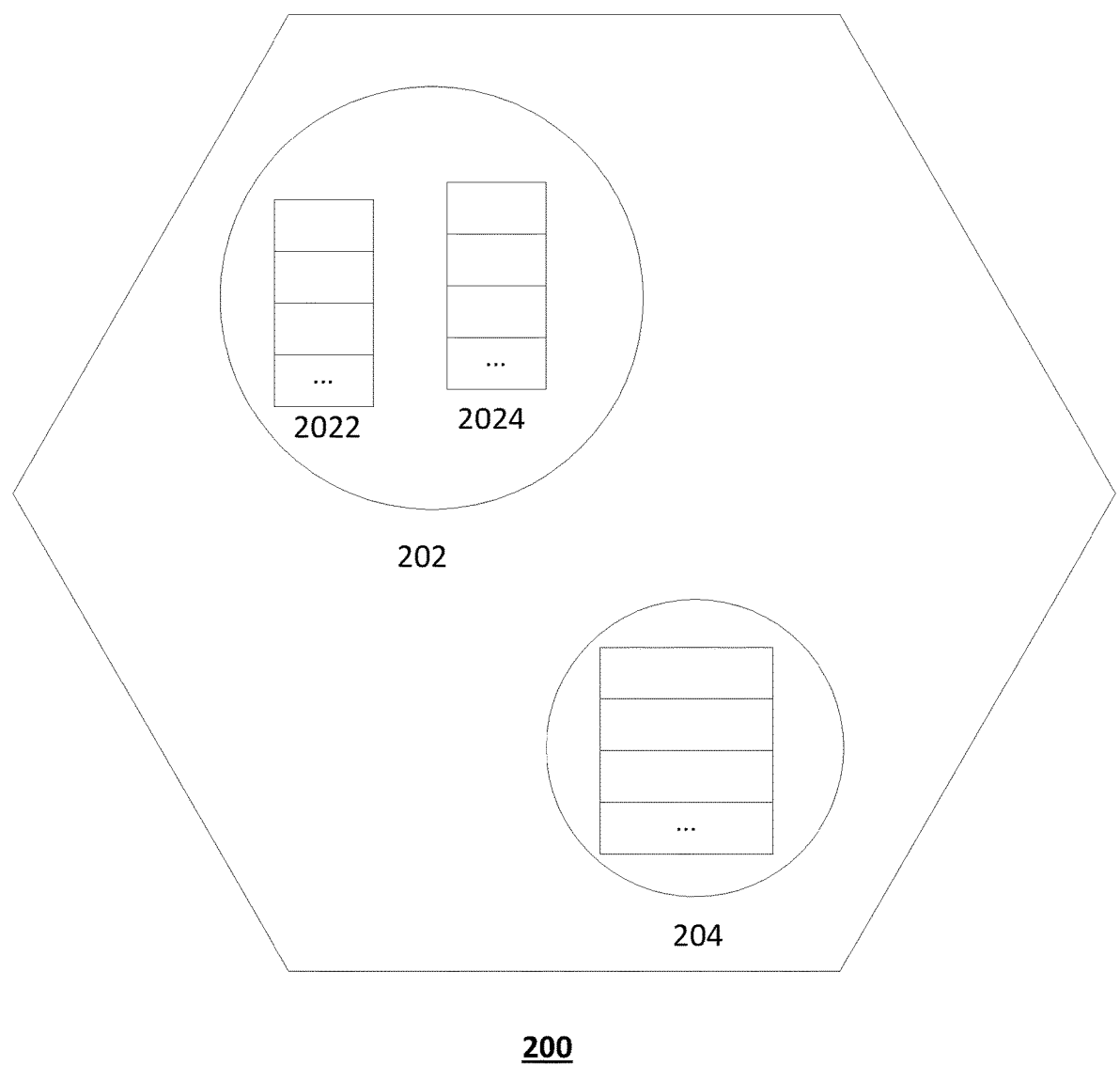
FIG. 2 illustrates a schematic diagram showing queuing zones in a district, according to embodiments of the disclosure

FIG. 2 illustrates a schematic diagram showing queuing zones in a district 200, according to embodiments of the disclosure. As shown in FIG. 2, for example, district 200 is a hexagonal district. In some embodiments, district 200 may include a plurality of queuing zones, such as 202 and 204. Each queuing zone can be associated with one or more request queues. For example, queuing zone 202 is associated with request queues 2022 and 2024.

Because providing a queue service consumes significant computational and storage resources, activation unit 112 can be configured to only activate a queue when a queue activation condition is met. For example, activation unit 112 can determine a number of transportation requests in the district and activate the queue based on the determined number. For instance, the queue activation condition can include the number of transportation requests exceeding available capacity of service vehicles by a predetermined value. As another example, the queue activation condition may include that the request be made during a predetermined period of time. It is contemplated that queueing conditions may include other suitable conditions, and any combinations of the conditions.

A queuing zone can be determined based on historical requests within the district, and may be associated with at least one zone attribute. The zone attributes can include a geographic attribute, an availability attribute, a service type attribute, and the like. For example, the geographic attribute can define a geographic scope of the queuing zone, such that only requests originating within the geographic scope can be associated with the queuing zone and the queues within the queuing zone. The availability attribute can define an available period of the queuing zone. For example, the queuing zone can only be allowed to receive requests between 9:00 AM and 10:00 PM. The service type attribute can define a service type that the requests within the queuing zone can receive. The service type can include at least one of a car-pooling service, a non-car-pooling service type, a luxury service, and the like.

It is contemplated that, queues associated with a queuing zone can include queue attributes. At least one of the queue attributes of the queues can be the same and corresponding to the at least one of the zone attributes. For example, queues 2022 and 2024 associated with queuing zone 202 can have a same geographic attribute as queuing zone 202. The queues, however, can have different available attributes and service type attributes. For example, queue 2022 can be a car-pooling queue, and queue 2024 can be a non-car-pooling queue.

Queue determination unit 106 can determine a queue associated with a queuing zone for placing transportation request 122. As discussed above, transportation request 122 can include request features of a request location, a request origin, a request destination, a departure time, a service type, a service vehicle type, and the like. Based on the request features of transportation request 122 and the above-mentioned zone attributes, queue determination unit 106 can determine the queuing zone for transportation request 122. For example, with reference to FIG. 2, queue determination unit 106 can determine if the request location of transportation request 122 falls within queuing zone 202, and if so, assign transportation request 122 to queuing zone 202. After queuing zone 202 has been determined, queue determination unit 106 can further determine a queue for transportation request 122 within queuing zone 202, according to queue attributes and the request features. For example, transportation request 122 is a non-car-pooling request, and therefore can be placed to queue 2022, which is a non-car-pooling queue.

Figure 3:
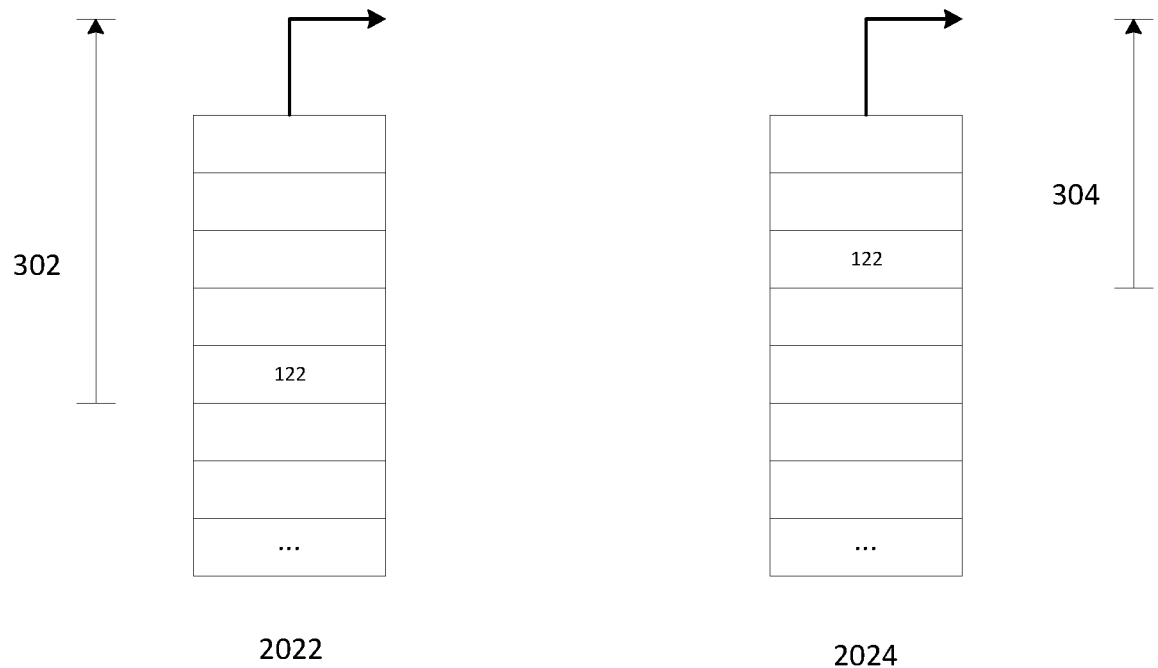
FIG. 3 illustrates an exemplary diagram of a transportation request in queues, according to embodiments of the disclosure.

Time estimation unit 108 can estimate a waiting time for transportation request 122 before being processed in a queue. In some embodiments, time estimation unit 108 can determine a processing speed of the queue, determine a position of the transportation request in the queue, and estimate the waiting time for the transportation request. FIG. 3 illustrates an exemplary diagram of a transportation request in queues, according to embodiments of the disclosure. For example, with reference to FIG. 3, time estimation unit 108 determines that the processing speed of queue 2022 is 5 minutes per request, and transportation request 122 is the fifth request in queue 2022. That is, four requests are ahead of transportation request 122 in queue 2022. Accordingly, estimated waiting time 302 before transportation request 122 can be processed is 5×4 minutes. It is contemplated that, other factors, such as traffic condition, weather condition, or the like, can also be considered for estimating the waiting time of a request in a queue. For example, under an extreme weather condition, the estimated waiting time can be increased.

To provide better recommendations to passengers, system 100 can further determine if processing time for transportation request 122 can be reduced by placing it in another queue. By identifying the existence of such another queue, system 100 can recommend an alternative travel plan to the passenger.

In some embodiments, queue determination unit 106 can further determine another queue associated with the queuing zone (e.g., 202). As discussed above, queuing zone 202 is associated with a car-pooling queue 2022 and a non-car-pooling queue 2024. Though transportation request 122 has been initially placed in car-pooling queue 2022 due to the mutual service type attribute (i.e., car-pooling), queue determination unit 106 can further determine a queue associated with queuing zone 202 for transportation request 122. For example, queue determination unit 106 can determine a queue having one queue attribute that is different from the determined queue having transportation request 122 placed therein. For example, queue determination unit 106 can determine that non-car-pooling queue 2024 is different from car-pooling queue 2022 by having a service type attribute of car-pooling. In some embodiments, the "another queue" can be any other queues associated with zone 202.

Time estimation unit 108 can estimate another waiting time for transportation request 122 before being processed in the newly-determined queue (e.g., 2024). For example, with reference to FIG. 3, if transportation request 122 were placed in queue 2024, only two requests would be ahead of transportation request 122. Accordingly, estimated waiting time 304 before transportation request 122 would be 5×2 minutes, which is shorter than estimated waiting time 302. Therefore, by placing transportation request 122 in queue 2024, the waiting time for transportation request 122 can be reduced by 10 minutes.

It is contemplated that, queuing zone 202 can include more than two queues. In that case, system 100 can determine a set of queues other than queue 2022 associated with queuing zone 202, determine estimated waiting times for transportation request 122 if placed in the respective queues, and identify the queue having a shortest estimated waiting time among all.

Based on the determined shorter estimated waiting time, with reference back to FIG. 1, interaction unit 110 can provide to terminal device 120 information related to the queue (e.g., 2024) having shorter estimated waiting time. For example, the information can be transmitted to terminal device 120 using communication interface 102. In some embodiments, the information can include a time difference between the estimated waiting times (e.g., 302 and 304) to indicate the amount of waiting time the passenger may save by switching to the other queue. In some embodiments, the information may include a recommendation for modifying transportation request 122 such that modified transportation request 122 is eligible for being placed in the queue having the shorter or shortest estimated waiting time. In some embodiments, the recommendation may also indicate an estimated service fee, if applicable, for modifying transportation request 122. In some embodiments, interaction unit 110 can provide the recommendation for modifying transportation request 122 when there is a significant reduction in waiting time, e.g., when the time difference being greater than or equal to a predetermined value.

Furthermore, if the passenger agrees with the recommendation, communication interface 102 can receive, from terminal device 120, an instruction to modify transportation request 120. Based on the received instruction, interaction unit 110 can modify transportation request 120 and place modified transportation request 120 in the corresponding queue (e.g., 2024).

Figure 4:
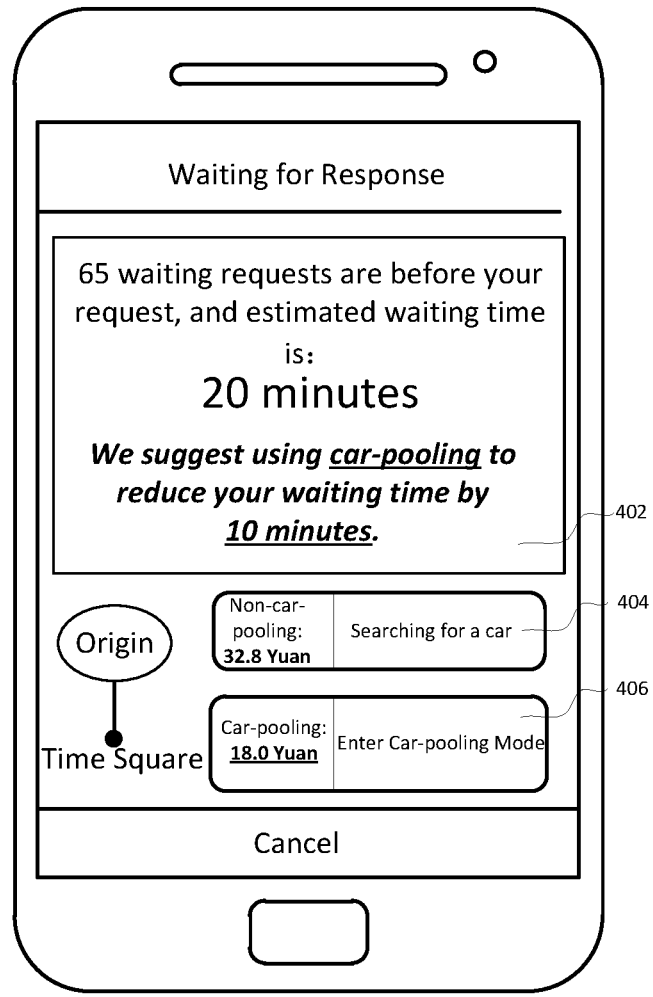
FIG. 4 illustrates an exemplary user interface displayed on a terminal device, according to embodiments of the disclosure.

FIG. 4 illustrates an exemplary user interface 400 displayed on a terminal device, according to embodiments of the disclosure.

As shown in FIG. 4, user interface 400 can include display sections 402, 404, and 406. Display section 402 can display the estimated waiting time (e.g., 302) associated with a first queue (e.g., 2022) where transportation request 122 is placed. Display section 402 can also display the recommendation for using a different queue (e.g., 2024) and the reduced waiting time. Display section 404 can display information associated with the first queue (e.g., 2022), such as the estimated fee. Display section 406 can display information associated with the recommended second queue (e.g., 2024), such as the estimated fee and the option for the passenger to send out the instruction for modifying transportation request 122.

Another aspect of the disclosure is directed to a method for processing transportation requests.

Figure 5:
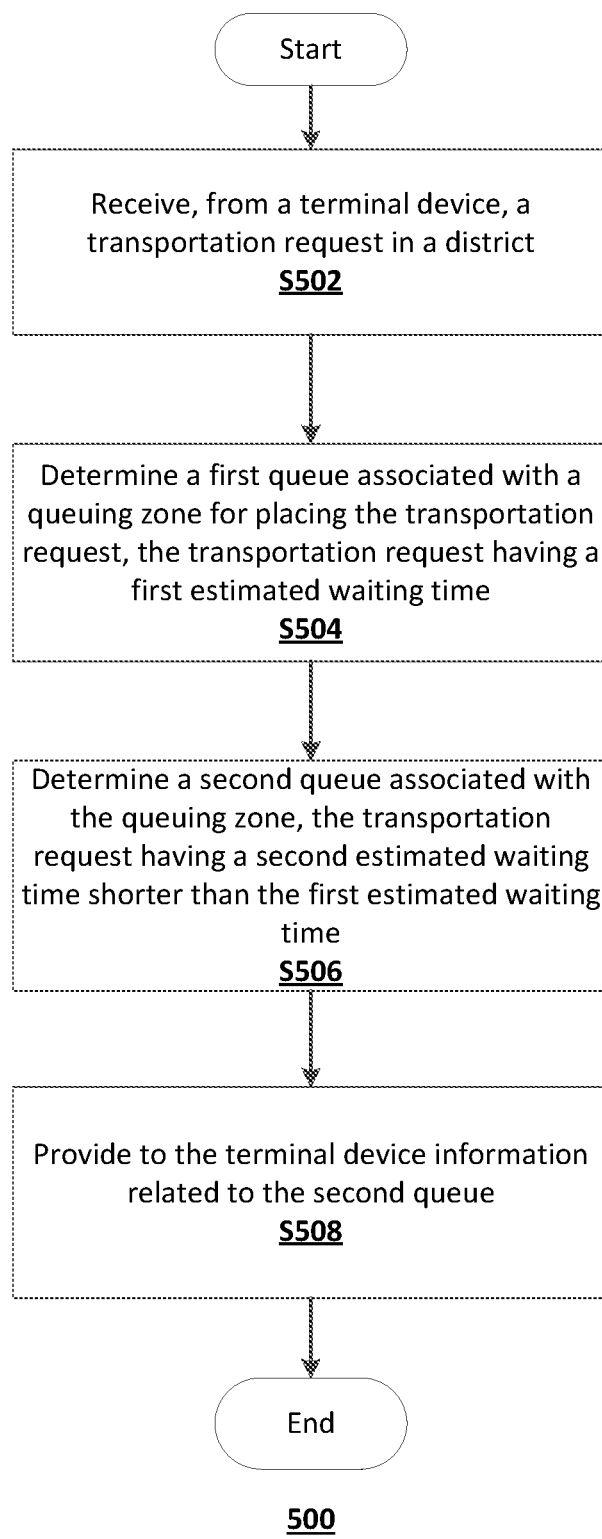
FIG. 5 is a flowchart of an exemplary method for processing transportation requests, according to embodiments of the disclosure.

FIG. 5 is a flowchart of an exemplary method 500 for processing transportation requests, according to embodiments of the disclosure. For example, method 500 may be implemented by system 100 including at least one processor, and method 500 may include steps S502-S508 as described below.

In step S502, system 100 can receive, from a terminal device, a transportation request 122 in a district. The transportation request can include request features, such as a current location of the passenger, an origin and a destination of the requested transportation, a departure time, a service type, a service e vehicle type, or the like. In some embodiments, the district can be predetermined by system 100 based on the origin of the requested transportation service. For example, the district can be a hexagonal area that is neighbored with other hexagonal areas. It is contemplated that, the district can have shapes other than a hexagon, such as a circle, a square, a rectangle, etc. In some embodiments, the district can have a shape and size dynamically determined based on the current location of the terminal device. The district may include a plurality of queuing zones. Each queuing zone can be associated with one or more request queues.

A queue can be activated when a queue activation condition is met. For example, activation unit 112 can determine a number of transportation requests in the district and activate the queue based on the determined number. The queue activation condition can include the number of transportation requests exceeding available capacity of service vehicles by a predetermined value. As another example, the queue activation condition may include that the request be made during a predetermined period of time.

A queuing zone can be determined based on historical requests within the district, and may be associated with at least one zone attribute. The zone attribute can include a geographic attribute, an availability attribute, a service type attribute, and the like. For example, the geographic attribute can define a geographic scope of the queuing zone, such that only requests originating within the geographic scope can be associated with the queuing zone and the queues within the queuing zone. The available attribute can define an available period of the queuing zone. For example, the queuing zone can only be allowed to receive requests between 9:00 AM and 10:00 PM. The service type attribute can define a service type that the requests within the queuing zone can receive. The service type can include at least one of a car-pooling service, a non-car-pooling service type, a luxury service, and the like.

It is contemplated that, queues associated with a queuing zone can include queue attributes. At least one of the queue attributes of the queues can be the same and corresponding to the at least one of the zone attributes. For example, a queuing zone can be associated with a first queue and a second queue. The first and second queues can have a same geographic attribute as queuing zone. The first and second queues, however, can have different available attributes and service type attributes. In an example, the first queue can be a car-pooling queue, and the second queue can be a non-car-pooling queue.

In step S504, system 100 can determine a first queue associated with a queuing zone for placing the transportation request. As discussed above, the transportation request can include request features of a request location, a request origin, a request destination, a departure time, a service type, a service vehicle type, and the like. Based on the request features of the transportation request and the above-mentioned zone attributes, system 100 can determine the queuing zone for the transportation request, for example, based on the determination of the transportation request being within the queuing zone. After the queuing zone has been determined, system 100 can further determine the first queue for the transportation request within the queuing zone, according to queue attributes and the request features. For example, the transportation request is a non-car-pooling request, and therefore can be placed to the first queue, which is a non-car-pooling queue.

Meanwhile, system 100 can estimate a first waiting time for the transportation request before being processed in the first queue. In some embodiments, system 100 can determine a processing speed of the first queue, determine a position of the transportation request in the first queue, and estimate the first waiting time for the transportation request.

In step S506, system 100 can further determine a second queue associated with the queuing zone. The transportation request can have a second estimated waiting time before being processed in the second queue. And the second estimated waiting is shorter than the first estimated waiting time. In some embodiments, the second queue can have one queue attribute that is different from the first queue. The bottom line for the second queue is the second queue should be enclosed together with the first queue by a same queuing zone. For example, the first queue is a car-pooling queue, the second queue is non-car-pooling queue, and both the first and second queues are enclosed by the queuing zone. When the second queue is determined, system 100 can estimate a second waiting time for the transportation request before being processed in the second queue.

Figure 6:
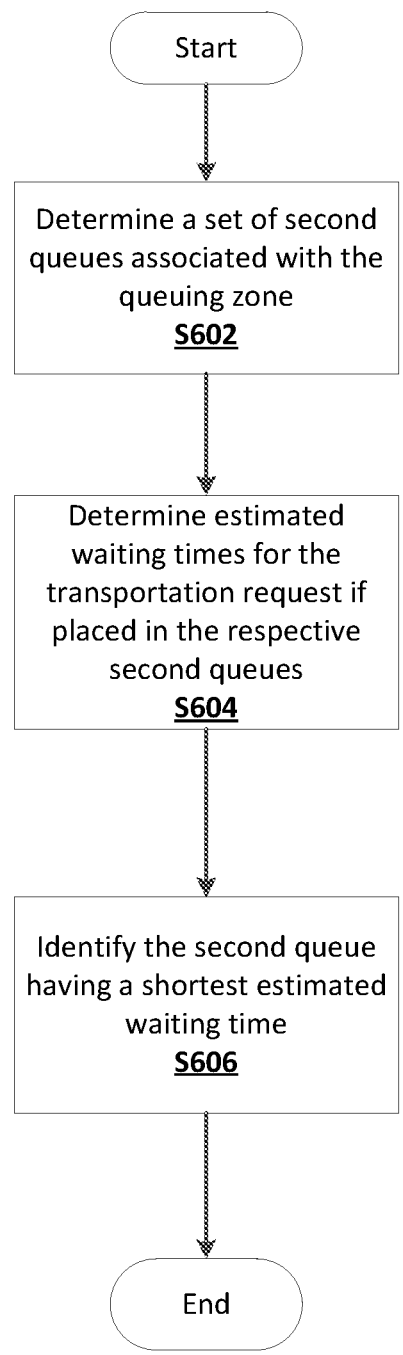
FIG. 6 is a flowchart of an exemplary method for determining a second queue among a plurality of queues, according to embodiments of the disclosure.

It is contemplated that, the queuing zone can include more than two queues. Therefore, system 100 can perform a method for determining the second queue among a plurality of queues. FIG. 6 is a flowchart of an exemplary method 600 for determining a second queue among a plurality of queues, according to embodiments of the disclosure. For example, method 600 may be implemented by system 100 as a separate method or a part of method 600. Method 600 may include steps S602-S606 as described below.

In step S602, system 100 can determine a set of second queues associated with the queuing zone. As discussed above, the set of second queues can be enclosed by the queuing zone, and include at least one attribute different from the first queue in the same queuing zone.

In step S604, system 100 can determine estimated waiting times for the transportation request if placed in the respective queues. The process for determining the estimated waiting times has been discussed and the description of which will not be repeated herein.

In step S606, system 100 can identify the queue having a shortest estimated waiting time. Therefore, system 100 can identify a second queue that can reduce the waiting time of the transportation request but still meet most requirements of the transportation request.

With reference back to FIG. 5, in step S508, system 100 can provide to the terminal device information related to the second queue having shorter estimated waiting time. The information can include a time difference between the first and second estimated times to indicate the amount of waiting time the passenger may save by switching to the other queue. In some embodiments, the information may include a recommendation for modifying the transportation request such that the modified transportation request is eligible for being placed in the queue having the shorter estimated waiting time. In some embodiments, the recommendation can also indicate an estimated service fee, if applicable, for modifying transportation request. In some embodiment, system 100 can provide the recommendation for modifying the transportation request when there is a significant reduction in waiting time, e.g., when a time difference between the first and second estimated waiting times being greater than or equal to a predetermined value.

Furthermore, if the passenger agrees with the recommendation, system 100 can receive, from the terminal device, an instruction to modify the transportation request. Based on the received instruction, system 100 can then modify the transportation request and place the modified transportation request in the second queue.

Another aspect of the disclosure is directed to a non-transitory computer-readable medium storing instructions which, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It will be apparent to those skilled in the art that various modifications and variations can be made to the disclosed system and related methods. Other embodiments will be apparent to those skilled in the art from consideration of the specification and practice of the disclosed system and related methods.

It is intended that the specification and examples be considered as exemplary only, with a true scope being indicated by the following claims and their equivalents.

What is claimed is:

1. A computer-implemented method for processing transportation requests, comprising:
   receiving, via a communication interface connected to one or more of a cellular communication network, a wireless local area network (WLAN), or a wide area network (WAN), a transportation request in a district from a terminal device;
   determining, via a processor, a first queue in a memory, the first queue being associated with a queuing zone and placing the transportation request in the first queue;
   determining, via the processor, a first estimated waiting time for the transportation request in the first queue;
   determining, via the processor, a second queue in the memory, the second queue being associated with the queuing zone;
   determining, via the processor, a second estimated waiting time for the transportation request if placed in the second queue, wherein the second estimated waiting time is shorter than the first estimated waiting time;
   displaying, by the processor, on a user interface of the terminal device information related to the first queue and the second queue, wherein the displaying comprises:
      displaying, in a first display section of the user interface, a number of waiting requests before the transportation request in the first queue, and a recommendation for using a second transportation corresponding to the second estimated waiting time;
      displaying, in a second display section of the user interface, a first option for searching for a first transportation corresponding to the first estimated waiting time; and
      displaying, in a third display section of the user interface, a second option for selecting the second transportation corresponding to the second estimated waiting time;
   receiving, from the terminal device, an instruction to modify the transportation request;
   modifying the transportation request; and
   placing the modified transportation request in the second queue;
   wherein determining the second queue associated with the queuing zone further comprises:
   determining a zone attribute of the queuing zone, the zone attribute including at least one of a geographic attribute, an availability attribute, or a service type attribute; and
   determining a queue that matches the determined zone attribute of the queuing zone as the second queue.

2. The method of claim 1, further comprising:
   activating the first queue when a queue activation condition is met.

3. The method of claim 2, further comprising determining a number of transportation requests in the district, wherein the queue activation condition includes:
   the number of transportation requests exceeding available capacity of service vehicles by a first predetermined value.

4. The method of claim 1, wherein the first estimated waiting time is determined by:
   determining a processing speed of the first queue;
   determining a position of the transportation request in the first queue; and
   estimating the first waiting time for the transportation request.

5. The method of claim 1, wherein the second queue is different from the first queue in a service type, wherein the service type includes at least one of a car-pooling service, a non-car-pooling service, a luxury service.

6. The method of claim 1, further comprising:
   in response to a time difference between the first estimated waiting time and the second estimated waiting time being greater than or equal to a predetermined value, providing the recommendation to the terminal device to modify the transportation request such that the modified transportation request is eligible for being placed in the second queue.

7. The method of claim 6, further comprising:
   providing the time difference to the terminal device.

8. The method of claim 1, wherein determining the second queue further comprises:
   determining a set of second queues associated with the queuing zone;
   determining estimated waiting times for the transportation request if placed in the respective second queues; and
   identifying the second queue having a shortest estimated waiting time.

9. A system for processing transportation requests, comprising:
   a communication interface connected to one or more of a cellular communication network, a wireless local area network (WLAN), or a wide area network (WAN), the communication interface being configured to receive, from a terminal device, a transportation request in a district;
   a memory; and
   at least one processor coupled to the communication interface and the memory and configured to:
      determine a first queue in the memory, the first queue being associated with a queuing zone and place the transportation request in the first queue;
      determine a first estimated waiting time for the transportation request in the first queue;
      determine a second queue in the memory, the second queue being associated with the queuing zone;
      determine a second estimated waiting time for the transportation request if placed in the second queue, wherein the second estimated waiting time is shorter than the first estimated waiting time;
      display, on a user interface of the terminal device, information related to the first queue and the second queue, wherein displaying the information comprises:
         displaying, in a first display section of the user interface, a number of waiting requests before the transportation request in the first queue, and a recommendation for using a second transportation corresponding to the second estimated waiting time;
         displaying, in a second display section of the user interface, a first option for searching for a first transportation corresponding to the first estimated waiting time; and
         displaying, in a third display section of the user interface, a second option for selecting the second transportation corresponding to the second estimated waiting time;
      receive, from the terminal device, an instruction to modify the transportation request;
      modify the transportation request; and
      place the modified transportation request in the second queue;

wherein determining the second queue associated with the queuing zone further comprises:
determining a zone attribute of the queuing zone, the zone attribute including at least one of a geographic attribute, an availability attribute, or a service type attribute; and
determining a queue that matches the determined zone attribute of the queuing zone as the second queue.

10. The system of claim 9, wherein the at least one processor is further configured to:
activate the first queue when a queue activation condition is met.

11. The system of claim 10, wherein the at least one processor is further configured to determine a number of transportation requests in the district, and the queue activation condition includes: the number of transportation requests exceeding available capacity of service vehicles by a first predetermined value.

12. The system of claim 9, wherein the at least one processor is further configured to determine the first estimated waiting time by:
determining a processing speed of the first queue;
determining a position of the transportation request in the first queue; and
estimating the first waiting time for the transportation request.

13. The system of claim 9, wherein the second queue is different from the first queue in a service type, wherein the service type includes at least one of a car-pooling service, a non-car-pooling service, a luxury service.

14. The system of claim 9, wherein the at least one processor is further configured to:
in response to a time difference between the first estimated waiting time and the second estimated waiting time being greater than or equal to a predetermined value, provide the recommendation to the terminal device to modify the transportation request such that the modified transportation request is eligible for being placed in the second queue.

15. The system of claim 14, wherein the at least one processor is further configured to:
provide the time difference to the terminal device.

16. The system of claim 14, wherein the at least one processor is further configured to determine the second queue by:
determining a set of second queues associated with the queuing zone;
determining estimated waiting times for the transportation request if placed in the respective second queues;
identifying the second queue having a shortest estimated waiting time.

17. A non-transitory computer-readable medium that stores a set of instructions that, when executed by at least one processor of an electronic device, cause the electronic device to perform a method for processing transportation requests, the method comprising:
receiving, via a communication interface connected to one or more of a cellular communication network, a wireless local area network (WLAN), or a wide area network (WAN), a transportation request in a district from a terminal device;
determining, via a processor, a first queue in a memory, the first queue being associated with a queuing zone and placing the transportation request in the first queue;
determining, via the processor, a first estimated waiting time for the transportation request in the first queue;
determining, via the processor, a second queue in the memory, the second queue being associated with the queuing zone;
determining, via the processor, a second estimated waiting time for the transportation request if placed in the second queue, wherein the second estimated waiting time is shorter than the first estimated waiting time;
displaying, by the processor, on a user interface of the terminal device information related to the first queue and the second queue, wherein the displaying comprises:
displaying, in a first display section of the user interface, a number of waiting requests before the transportation request in the first queue, and a recommendation for using a second transportation corresponding to the second estimated waiting time;
displaying, in a second display section of the user interface, a first option for searching for a first transportation corresponding to the first estimated waiting time; and
displaying, in a third display section of the user interface, a second option for selecting the second transportation corresponding to the second estimated waiting time;
receiving, from the terminal device, an instruction to modify the transportation request;
modifying the transportation request; and
placing the modified transportation request in the second queue;
wherein determining the second queue associated with the queuing zone further comprises:
determining a zone attribute of the queuing zone, the zone attribute including at least one of a geographic attribute, an availability attribute, or a service type attribute; and
determining a queue that matches the determined zone attribute of the queuing zone as the second queue.

* * * * *